INVENTOR.
BY ALEXANDER BURNS

United States Patent Office 3,282,362
Patented Nov. 1, 1966

3,282,362
AIR CUSHION VEHICLE FOR A STRETCHER
Alexander Burns, Hampton, Va., assignor to the United States of America as represented by the Secretary of the Army
Filed Aug. 18, 1964, Ser. No. 390,487
3 Claims. (Cl. 180—7)

The invention disclosed herein may be manufactured and used by or for the Government for governmental purposes without payment to me of any royalty thereon.

This invention relates to improvements in air cushion vehicles or ground effects machines and more particularly to an air cushion vehicle particularly designed and constructed to move incapacitated persons, such as wounded combatants in a battle area.

While the device may be used for various purposes its most important use is conceived to be used by stretcher bearers for removing stretcher borne casualties from a battle area to locations at which such casualties can be given first aid or from which they can be removed by military ambulances. The duties of stretcher bearers are frequently strenuous and hazardous and it is difficult at times for two stretcher bearers to remove a wounded person under combat conditions. When only one stretcher is available the taks may become impossible. It is therefore conceived that suitable equipment for facilitating removal of casualties from battle areas and rendering the task possible of accomplishment by a single operator is highly meritorious.

Previous attempts to provide such equipment have not been successful. Stretcher carrying vehicles provided with wheels are not only nearly impossible to move over the rough terrain of battle areas but are too easily upset and even if moved without upsetting, do serious damage to injured passengers, and vehicles with runners or skids require too much effort to move, except on snow or ice.

Because of the shortcomings of wheel and skid or runner borne vehicles attempts have been made to provide air borne vehicles for this purpose and the present invention relates to a highly successful vehicle of this type.

It is therefore, among the objects of the invention to provide an air-borne vehicle operative within ground effect which can be used to carry loads, such as stretchers supporting injured or wounded persons, over areas of rough terrain, such as battlefield areas, with only a reasonable propulsive effort.

A further object resides in the provision of an airborne vehicle of the character indicated which is highly stable in operation and can carry a stretcher supported passenger without danger or injury to the passenger.

A still further object resides in the provision of an airborne vehicle of the character indicated which can be maintained in air-borne condition by the expenditure of a very small amount of power and which can be operated and controlled by a single operator.

An additional object resides in the provisions of a stretcher carrying vehicle of the character indicated on which a stretcher can be easily mounted and from which the stretcher can be easily removed.

Other objects and advantages will become apparent from a consideration of the following description and the appended claims in conjunction with the accompanying drawings wherein:

Figure 1:
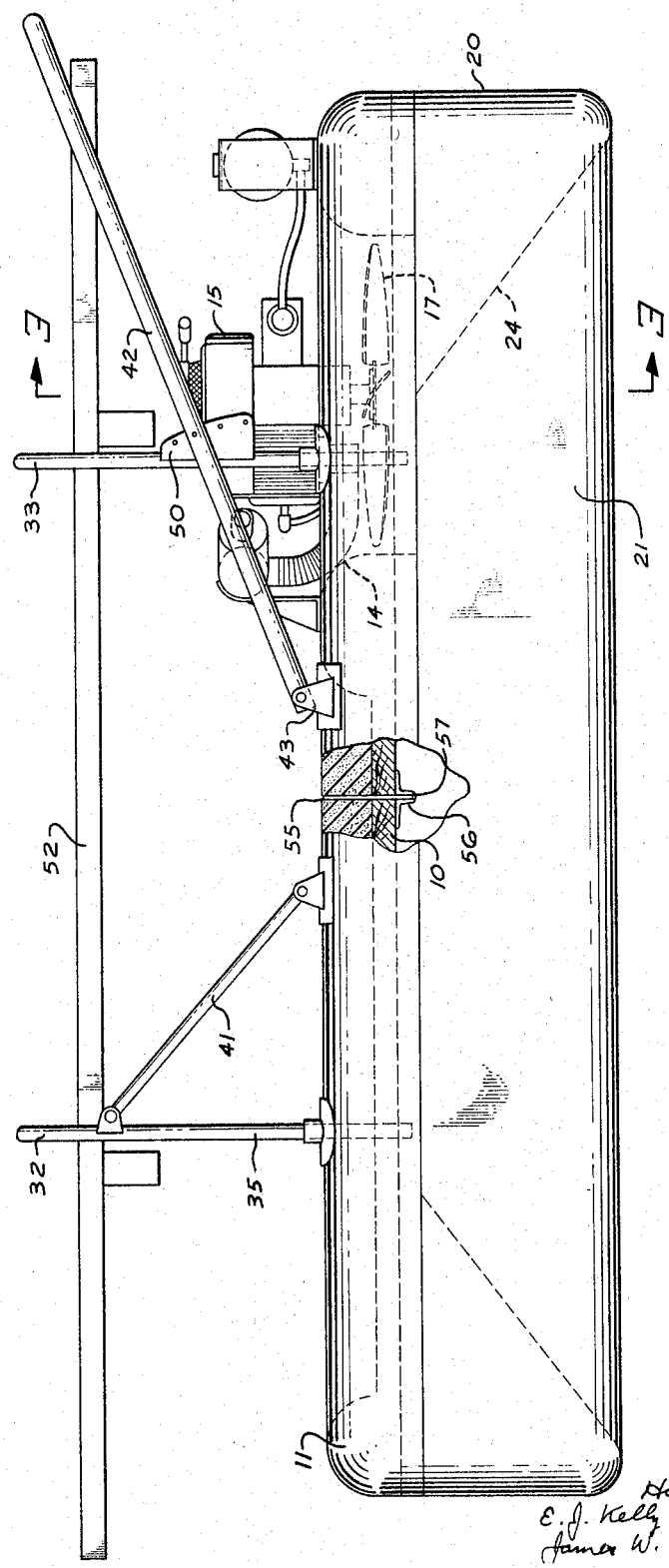
FIG. 1 is a side elevational view of a ground effects or air cushion supported vehicle illustrative of the invention.
Figure 2:
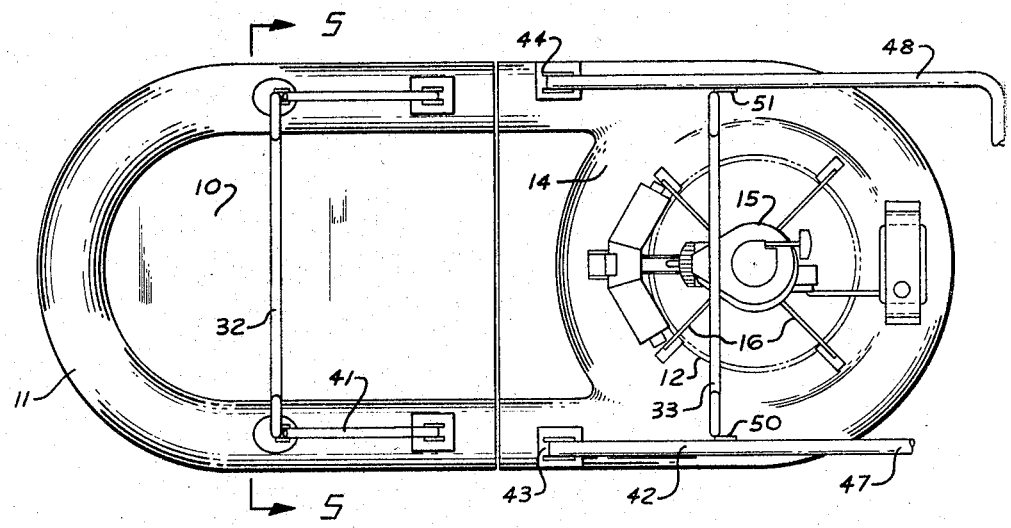
FIG. 2 is a top plan view, on a reduced scale, of the vehicle shown in FIG. 1.

With continued reference to the drawings, the vehicle has a flat deck or platform structure 10 having parallel straight sides and semi-circular ends. A bead or molding 11 of rounded or somewhat semi-circular cross sectional shape extends marginally around the top surface of platform 10 and may be filled with a stiffening or reinforcing material, such as a hardened plastic foam. The platform, including the molding 11, may be formed of a glass fiber and palstic adhesion laminate to provide a rigid lightweight structure of adequate strength and durability.

Near one end of the platform is provided with a circular air passage opening 12 and a section 14 of the molding 11 extends around the inner side of this opening. A small gasoline engine 15 of a suitable commercial manufacture is positioned centrally above the platform opening 12 and is supported on suitable struts or brackets 16 extending radially from the engine to the portion of the molding surrounding the opening 12. A fan or impeller 17 is mounted on the engine crankshaft at the lower end of the engine and forces air from the atmosphere through the opening 12 for a purpose to be presently described.

Figure 3:
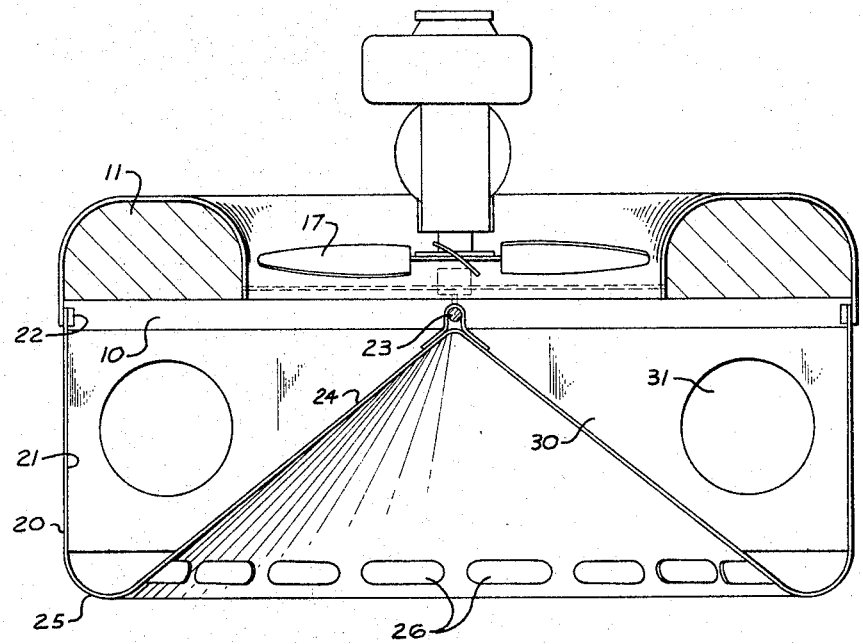
FIG. 3 is a transverse cross sectional view substantially on a plane indicated by the line 3—3 on FIG. 1.
Figure 4:
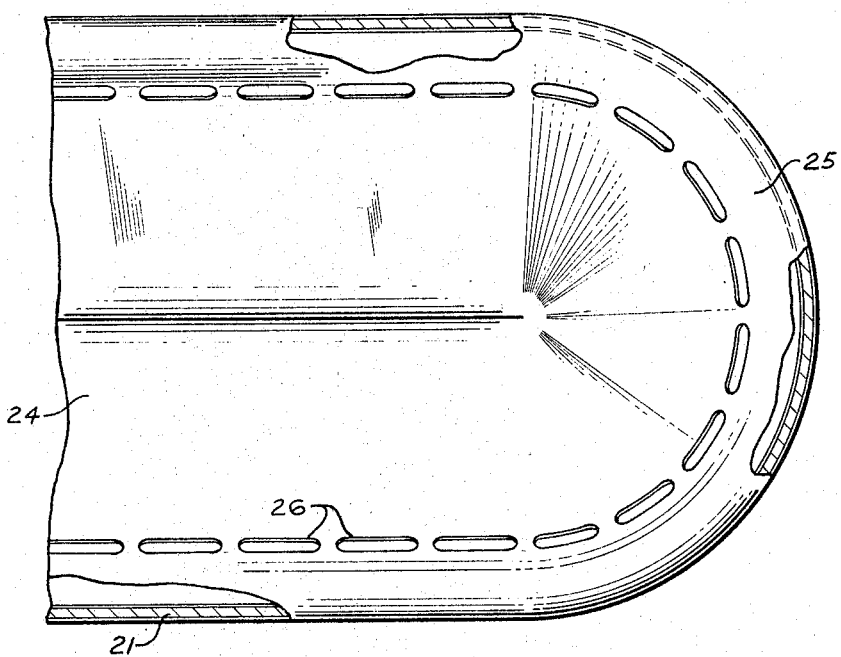
FIG. 4 is a fragmentary bottom plan view of the vehicle shown in FIG. 1.
Figure 5:
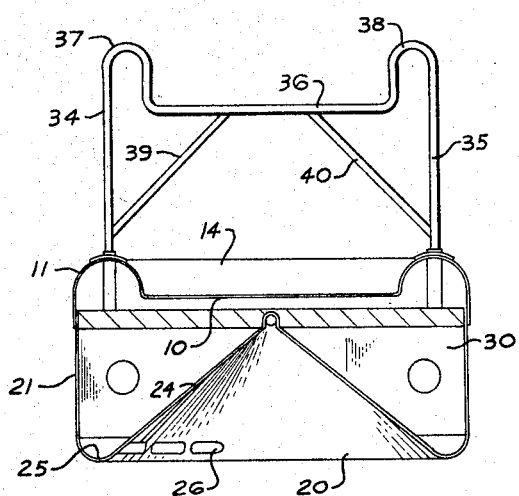
FIG. 5 is a transverse cross sectional view substantially on a plane indicated by the line 5—5 on FIG. 2.

An inflatable skirt 20 of flexible, substantially air impervious sheet material is secured to the under side of the platform for supporting the platform above the underlying surface, such as the surface of the ground. This skirt has an outer wall 21 extending entirely around the outer edge of the platform and attached at its upper edge to the platform by a flange and strip arrangement 22. A rod 23 extends longitudinally and medially of the under side of the platform between the centers of curvature of the two semi-circular end portions of the platform and the skirt has an inner wall 24 secured along its mid-width location to the rod 23 and extending downwardly and outwardly at both sides of the rod. The portions of the skirt inner wall under the rounded end portions of the platform are semi-conical in shape, as shown in FIGS. 3, 4, and 5. The bottom portions of the outer and inner walls of the skirt are integrally joined by a bottom wall portion 25 which is curved to present a convex surface to the underlying supporting surface. This bottom wall is provided with a series of spaced apart air outlet openings or slots 26. Since the interior of the hollow skirt underlies the fan and opening 12 in the platform, air will be forced by the fan 17 into the skirt to inflate the skirt and will be discharged through the openings 26. The openings 26 are in the inner portion of the bottom wall 25 so that air discharged through these openings will flow into the space surrounded by the inner wall of the skirt which space serves as a plenum chamber accumulating a body of air at higher than atmospheric pressure. This air will raise the vehicle to provide an escape gap between the wall 25 of the skirt and the underlying surface and will maintain this gap at a height such that the escape of air through the discharge gap substantially balances the flow of air fed into the skirt by the fans. The downwardly and inwardly directed air jets from the openings 26 also provide a lifting force on the vehicle and act to retard the outflow of air through the air discharge gap thus providing a wider gap and a higher operating altitude of the vehicle above the ground than would be possible with a simple plenum chamber arrangement.

The height of the inflated skirt may be varied to some extent but should be kept within a range that will enable the vehicle to pass over obstructions of reasonable size and negotiate uneven terrain without rendering the vehicle objectionably unstable. The shape of the skirt is maintained by a number of diaphragms or flexible bulkheads, as indicated at 30, extending transversely across the interior of the skirt at spaced apart locations and secured along their edges to the inner, bottom and outer walls of the skirt. Each bulkhead is provided with an opening as indicated at 31, for the passage of air from the fan opening around the interior of the skirt and the openings may decrease progressively in size in a direction away from the fan to provide a better distribution of air around the skirt.

Suitable stanchions 32 and 33 extend upwardly from the platform, one near each center of curvature of the semi-circular end formations of the platform. Each stanchion is formed of suitable metal tubing and is of inverted U-shape comprising a pair of spaced apart and substantially parallel legs 34 and 35 secured at their lower ends in the molding 11 at respectively opposite sides of the platform, and a cross bar 36 extending between the upper end portions of the legs. Each leg is provided at its upper end with a return bend formation, as indicated at 37 and 38, to provide structure extending above the cross bar to hold a stretcher on the stanchions while being carried by the vehicle. The stanchion is transversely reinforced by diagonal braces 39 and 40 and is securely held in upright position by angle braces, as indicated at 41.

A control handle 42 is provided in the form of a U-shaped member or bail, also preferably formed of metal tubing, and having substantially parallel legs secured at the open end of the bail to the molding 11 between the stanchions 32 and 33 and at respectively opposite sides of the platform by pivot brackets 43 and 44. The legs 47 and 48 of the handle extend past the upright legs of the stanchion 33 and the stanchion legs carry plates 50 and 51 provided with vertically spaced apart apertures. The legs of the handle carry pins which can be selectively engaged in the apertures in the corresponding plates to adjust the height of the handle.

As shown in FIG. 1, the platform 10 is provided in two pieces of substantially equal length separated by a vertical separation 55 extending transversely across the platform at or adjacent the mid-length location of the platform. A hinge 56 extends transversely of the lower surface of the platform below the separation plane 55 and has its pin or pins 57 disposed below the platform. With this arrangement the two parts of the platform can be folded together with the bottom surfaces opposed and substantially in contact. The flexible skirt will readily fold in between the two parts of the platform and when thus folded and the stanchions 32 and 33 removed from their sockets and secured in flat position on the folded body of the machine the entire machine can be carried as a back pack by one person. Suitable shoulder straps, not illustrated, may be secured to the device to facilitate its transportation as a back pack. The hinge arrangement provides a knee action so that, when the device is unfolded and placed in upright position on the ground, it will remain in flat, operative condition.

When the vehicle has been loaded, as with stretcher 52 carrying an injured person, one operator, by grasping the cross bar of the handle 42 can easily control and manuever the vehicle. Since the vehicle rides above the ground on a cushion of air, there is no noticeable frictional resistance to movement of the vehicle in any direction. The vehicle can pass over soft ground, water, snow and sand with no appreciable increase in effort. It is light in weight and easily transportable and, since its power requirements are small, providing fuel is not a serious problem.

While a particular embodiment has been illustrated in the accompanying drawings and hereinabove described for the purpose of disclosing the invention, it is to be understood that the scope of the invention is not limited to the particular embodiment so illustrated and described but is commensurate with the scope of the appended claims.

I claim:

1. In an air cushion vehicle for use in carrying a stretcher including a rigid platform having an air passage opening therethrough, an air impeller mounted on said platform above said opening, drive means for said impeller, an inflatable skirt of flexible sheet material disposed below said platform and comprising an outer wall secured at its upper edge entirely around said platform and depending vertically therefrom, a bottom wall extending inwardly from the lower portion of said outer wall, an inner wall disposed within said skirt providing a plenum chamber, said bottom wall having a series of spaced air outlet slots communicating with said plenum chamber, the improvement comprising a reinforcing molding extending marginally around the upper surface of said platform, at least two spaced U-shaped stanchions secured to said molding including a recessed bight portion projecting above said platform, and a stretcher removably seated in said recessed bight portion.

2. The structure of claim 1, and a handle attached to said platform and extending beyond one end thereof for guiding and controlling the vehicle, and means adjusting the height of said handle in selective predetermined positions relative to the ground.

3. The structure of claim 1, wherein said platform comprises at least two sections of substantially equal length, hinge means securing the undersurface of said sections together to permit same to be folded when not in use, and said stanchions being removably secured to said molding whereby said air cushion vehicle can be folded and carried while same is being transported prior to carrying a stretcher.

References Cited by the Examiner

UNITED STATES PATENTS

| | | | |
|---|---|---|---|
| 1,407,690 | 2/1922 | Berry | 280—47.17 X |
| 2,993,462 | 7/1961 | Gough | 180—7 |
| 3,096,728 | 7/1963 | Amann et al. | 180—7 |
| 3,139,947 | 7/1964 | Beardsley | 180—7 |
| 3,161,247 | 12/1964 | Mackie | 180—7 |
| 3,164,103 | 1/1965 | Lathers et al. | 180—7 |
| 3,237,708 | 3/1966 | Strasser et al. | 180—7 |

FOREIGN PATENTS 110,826 11/1917 Great Britain.

BENJAMIN HERSH, *Primary Examiner.*

LEO FRIAGLIA, *Examiner.*

M. S. SALES, *Assistant Examiner.*